United States Patent
Bilugu et al.

(10) Patent No.: US 11,677,778 B2
(45) Date of Patent: Jun. 13, 2023

(54) PROTECTING DATA IN NON-VOLATILE STORAGES PROVIDED TO CLOUDS AGAINST MALICIOUS ATTACKS

(71) Applicant: Oracle International Corporation, Redwood Shores, CA (US)

(72) Inventors: Prasad Bilugu, Hyderabad (IN); Praveen Kumar Kannoju, Hyderabad (IN); Nageswara Rao Samudrala, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 215 days.

(21) Appl. No.: 16/949,175

(22) Filed: Oct. 19, 2020

(65) Prior Publication Data
US 2022/0124117 A1   Apr. 21, 2022

(51) Int. Cl.
*H04L 9/40* (2022.01)
*G06F 3/06* (2006.01)

(52) U.S. Cl.
CPC ........ *H04L 63/1441* (2013.01); *G06F 3/0622* (2013.01); *G06F 3/0655* (2013.01); *G06F 3/0679* (2013.01); *H04L 63/0245* (2013.01); *H04L 63/1416* (2013.01); *H04L 63/1425* (2013.01)

(58) Field of Classification Search
CPC ............. H04L 63/1441; H04L 63/0245; H04L 63/1416; H04L 63/1425; G06F 3/0622; G06F 3/0655; G06F 3/0679
See application file for complete search history.

(56) References Cited

U.S. PATENT DOCUMENTS

| | | | |
|---|---|---|---|
| 9,264,441 B2* | 2/2016 | Todd | G06F 21/564 |
| 9,282,116 B1* | 3/2016 | Rovniaguin | H04L 67/01 |
| 9,769,213 B1 | 9/2017 | Madisetti et al. | |
| 9,794,287 B1* | 10/2017 | Koster | H04L 63/1425 |

(Continued)

FOREIGN PATENT DOCUMENTS

KR   20170067118 A   6/2017

OTHER PUBLICATIONS

Container Security—Prisma—Palo Alto Networks, https://www.paloaltonetworks.com/prisma/cloud/compute-security/container-security, downloaded circa Aug. 10, 2020, 06 pages.

(Continued)

*Primary Examiner* — Kambiz Zand
*Assistant Examiner* — Afaq Ali
(74) *Attorney, Agent, or Firm* — Iphorizons PLLC; Narendra Reddy Thappeta

(57) ABSTRACT

Protecting data in non-volatile storages provided to clouds against malicious attacks. According to an aspect, multiple malicious patterns indicating respective malicious attacks to access non-volatile storages provided to clouds in a cloud infrastructure are maintained. When an access request is received, the data stream representing the access request is examined to determine whether the data stream contains any of the malicious patterns. If the data stream is found not to contain any malicious pattern, it is concluded that the access request is free of the malicious attacks. If the data stream is found to contain at least one malicious pattern, it is concluded that the access request is a malicious attack corresponding to the malicious pattern.

20 Claims, 11 Drawing Sheets

(56) References Cited

U.S. PATENT DOCUMENTS

| | | | |
|---|---|---|---|
| 9,866,573 B2* | 1/2018 | Kozlovsky | H04L 63/1416 |
| 10,114,970 B2* | 10/2018 | Goldfarb | G06F 21/6218 |
| 10,581,915 B2* | 3/2020 | Scherman | H04L 63/1425 |
| 2017/0012941 A1* | 1/2017 | Subbarayan | G06F 9/546 |
| 2017/0098071 A1 | 4/2017 | Stopel et al. | |
| 2018/0159729 A1* | 6/2018 | Deshmukh | H04L 49/70 |
| 2019/0294778 A1 | 9/2019 | De Gaetano et al. | |
| 2020/0097676 A1* | 3/2020 | Margel | G06F 21/604 |
| 2020/0250310 A1* | 8/2020 | Zheng | H04L 63/145 |
| 2020/0296117 A1* | 9/2020 | Karpovsky | G06F 21/577 |
| 2020/0366660 A1* | 11/2020 | Vasireddy | H04L 63/0807 |

OTHER PUBLICATIONS

Sari Sultan, et al., Container Security: Issues, Challenges, and the Road Ahead, Apr. 17, 2019, 21 Pages.

V.Maruthi, et al., Enhanced Adaptive Learning Mechanism for Cloud Selection, International Journal of Engineering & Technology,2018, pp. 512-517.

Cloud Container Security Best Practices, https://www.secureworks.com/blog/cloud-container-security-best-practices, downloaded circa Aug. 10, 2020, 06 pages.

Container security, https://cloud.google.com/containers/security, downloaded circa Aug. 10, 2020, 11 pages.

Container security requires continuous security in new DevSecOps models, https://www.helpnetsecurity.com/2020/01/22/container-security-continuous-security/, downloaded circa Aug. 10, 2020, 04 pages.

Adaptive Data Security Techniques in Cloud Computing, https://www.researchgate.net/publication/332401793_Adaptive_Data_Security_Techniques_in_Cloud_Computing, downloaded circa Aug. 10, 2020, 06 pages.

* cited by examiner

| | container_name | pattern | file_name | event_date_time |
|---|---|---|---|---|
| | 801 | 802 | 803 | 804 |
| 810 → | container1 | FC260000000000000 | jar.exe | 2020-04-02 12:11:46.732533 |
| 811 → | container2 | F20700000200000 | netbeans.exe | 2020-04-02 12:11:46.732533 |
| 812 → | container3 | F20700000200000 | netbeans.exe | 2020-03-11 23:47:45.323761 |
| 813 → | container1 | F20700000200000 | netbeans.exe | 2020-03-11 23:47:14.575645 |
| 814 → | container2 | 6E6372656D656E74 | jar.exe | 2020-03-11 23:40:17.302597 |
| 815 → | container3 | F20700000200000 | netbeans.exe | 2020-03-11 23:39:39.990606 |
| 816 → | container1 | F20700000200000 | netbeans.exe | 2020-03-11 23:39:27.687564 |
| 817 → | container2 | F20700000200000 | jar.exe | 2020-03-11 23:39:03.277382 |
| 818 → | container3 | 6E6372656D656E74 | jar.exe | 2020-03-11 23:36:32.281619 |
| 819 → | container1 | 6E6372656D656E74 | jar.exe | 2020-03-11 23:36:18.983599 |
| 820 → | container1 | 6E6372656D656E74 | jar.exe | 2020-03-11 23:16:21.314523 |
| 821 → | container3 | 6E6372656D656E74 | jar.exe | 2020-03-11 23:13:15.173250 |
| 822 → | container1 | 6E6372656D656E74 | jar.exe | 2020-03-11 23:11:47.460707 |
| 823 → | container2 | F20700000200000 | netbeans.exe | 2020-03-11 23:11:10.859401 |
| 824 → | container3 | 5F5A544953743130 | jar.exe | 2020-03-11 17:03:51.236954 |

*FIG. 8A*

| | 805 | 806 | 807 | 808 |
|---|---|---|---|---|
| | org_name | error_code | count | threshold_met_date_time |
| 831 → | org6 | ENOENT | 3 | 2020-04-04 18:06:17.874747 |
| 832 → | org1 | EINVAL | 3 | 2020-04-04 18:04:26.982867 |
| 833 → | org6 | EISDIR | 3 | 2020-04-04 17:50:35.788572 |

PROTECTING DATA IN NON-VOLATILE STORAGES PROVIDED TO CLOUDS AGAINST MALICIOUS ATTACKS

BACKGROUND OF THE DISCLOSURE

Technical Field

The present disclosure relates to cloud technologies and more specifically to protecting data in non-volatile storages provided to clouds against malicious attacks.

Related Art

Cloud infrastructure refers to a collection of processing nodes, connectivity infrastructure, data storages, etc., which are engineered to together provide a respective virtual infrastructure (typically computing and storage) for various customers, with the scale of such virtual infrastructure being specified often on demand. Processing nodes are generally implemented based on many processors, and examples of data storages include hard disk drives, solid state drives, etc.

A cloud refers to the virtual infrastructure provided for a specific customer/tenant. Each tenant may host desired applications/data services on their cloud(s), which are capable of processing user requests received from end user systems. Many vendors such as Oracle, Amazon, Google, etc., have corresponding public cloud infrastructures based on which clouds are provided for respective customers/tenants.

Non-volatile storage is provided as a part of a cloud to a customer (or corresponding applications) based on data storages of a cloud infrastructure. Non-volatile storage refers to memory storage which retains data even when the data storages are powered off, as is well known in the relevant arts. The non-volatile storage is often provided as a virtual storage mapped to respective non-volatile storage of the data storages.

Malicious attacks on storage are of substantial concern to cloud customers, particularly given the sharing of various resources of a cloud infrastructure. A malicious attack on storage is an attempt to introduce undesirable changes to the stored data, often with the result of compromising the integrity of the stored data and/or rendering the storage inaccessible. There is accordingly a need to protect data in non-volatile storages provided to clouds against malicious attacks.

BRIEF DESCRIPTION OF THE DRAWINGS

Example embodiments of the present disclosure will be described with reference to the accompanying drawings briefly described below.

FIG. 8A depicts a sample dashboard for reporting pattern-matching events in an embodiment.

FIG. 8B depicts a sample dashboard for reporting SCSI (Small Computer System Interface) errors in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Aspects of the present disclosure are directed to protecting data in non-volatile storages provided to clouds against malicious attacks. According to an aspect, multiple malicious patterns indicating respective malicious attacks to access non-volatile storages provided to clouds in a cloud infrastructure are maintained. When an access request is received, the data stream representing the access request is examined to determine whether the data stream contains any of the malicious patterns. If the data stream is found not to contain any malicious pattern, it is concluded that the access request is free of the malicious attacks. If the data stream is found to contain at least one malicious pattern, it is concluded that the access request is a malicious attack corresponding to the malicious pattern.

According to another aspect, access requests are forwarded to the non-volatile storages and respective response packets are received from the non-volatile storages. The packets are examined to determine if there exists a new malicious attack in the access requests. A common data pattern present in those of the access requests determined to have the new malicious attack, is added to the malicious patterns.

In an embodiment, the non-volatile storages include a first non-volatile storage and a second non-volatile storage respectively provided to a first logical machine and a second logical machine. The first non-volatile storage and the second non-volatile storage are provisioned as respective virtual storages based on a data storage of the cloud infrastructure. Each of the first logical machine and the second logical machine provides a respective virtual isolated computing machine for execution of applications. In an embodiment, each of the first logical machine and the second logical machine is a corresponding container of a different cloud.

According to yet another aspect, the existence of an error code representing problem in data access is checked in a first number of responses and the new malicious attack is concluded to be present if the same error code exists in such threshold number of responses.

In an embodiment, the access request is forwarded to one of the non-volatile storages if the access request is free of the malicious attacks and the access request is blocked if the access request is a malicious attack.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
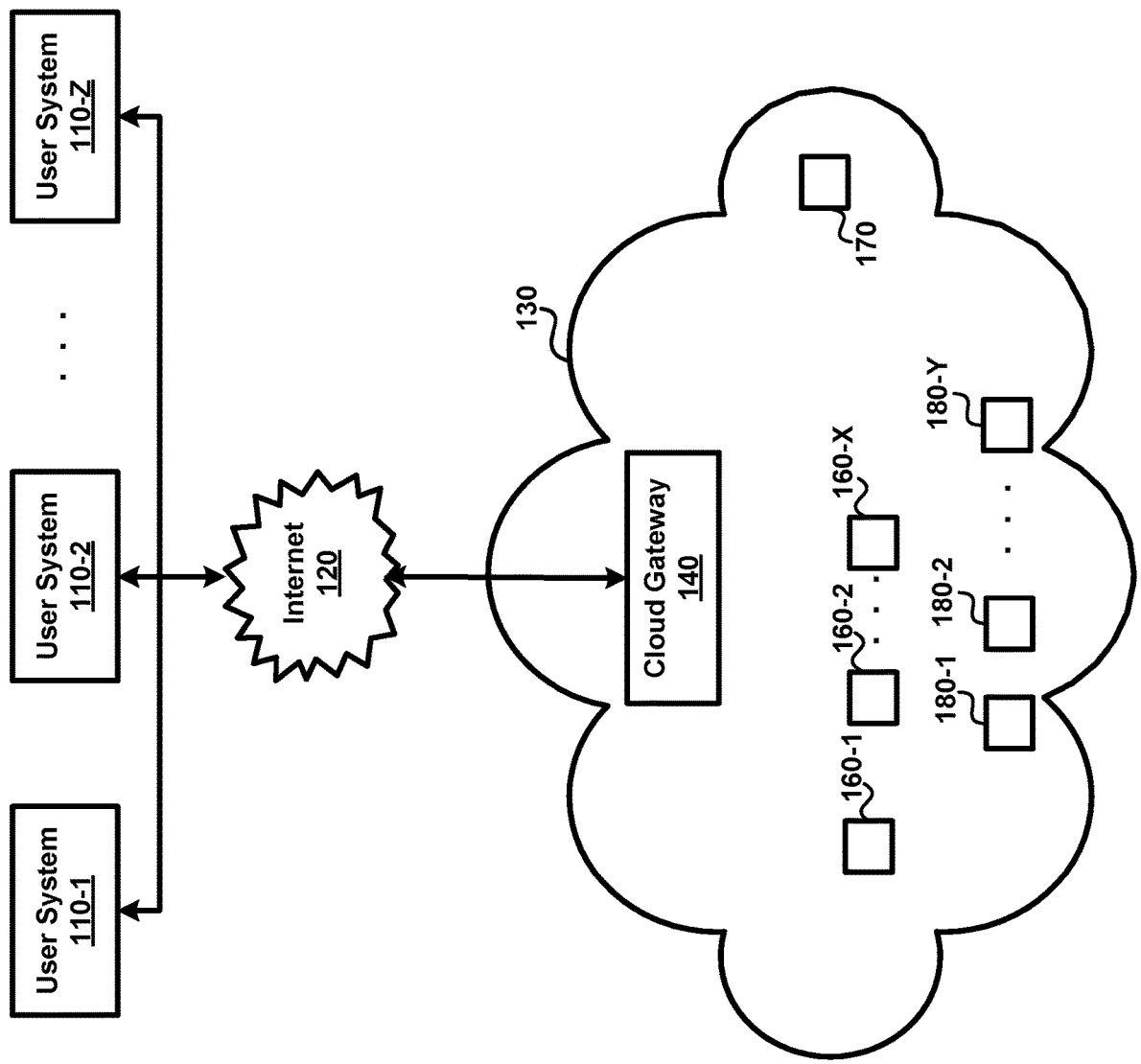
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing user systems 110-1 through 110-Z (Z representing any integer), internet 120 and cloud infrastructure 130. Cloud infrastructure 130 in turn is shown containing cloud gateway 140, processing nodes 160-1 through 160-X (X representing any integer), data nodes 180-1 through 180-Y (Y representing any integer) and utility system 170. The user systems and processing nodes are collectively or individually referred to by 110 and 160 respectively, as will be clear from the context. Similar convention is used in the description related to other blocks of various Figures as well.

Merely for illustration, only representative number/type of blocks is shown in FIG. 1. Many environments often contain many more blocks, both in number and type, depending on the purpose for which the environment is designed. Though processing nodes and data nodes are shown as disparate systems, it should be appreciated that some of the processing node would also be provided data storages internally. Each block of FIG. 1 is described below in further detail.

Cloud infrastructure 130 is a collection of processing nodes (160), connectivity infrastructure (not shown), data nodes (180), utility system (170), etc., which are engineered to together provide a virtual computing infrastructure for various customers, with the scale of such computing infrastructure being specified often on demand.

In one embodiment, each customer/tenant is provided with a corresponding virtual computing infrastructure (referred to as a "cloud") hosted on the nodes of cloud infrastructure 130. Clouds may be provided as any of infrastructure as a service, data as a service, or software as a service, etc., as is well known in the relevant arts. Once a cloud is provided, each customer may host desired applications/services on their cloud(s), which are capable of processing user requests received from user systems 110.

Each of user-systems 110 represents a system such as a personal computer, workstation, mobile device, computing tablet etc., used by users to generate access requests directed to applications (e.g., enterprise applications) executing in cloud infrastructure 130. The user requests may be generated using appropriate user interfaces (e.g., web pages provided by an enterprise application executing in a node, a native user interface provided by a portion of an enterprise application downloaded from a node, etc.).

In general, a user system requests an application for performing desired tasks and receives the corresponding responses (e.g., web pages) containing the results of performance of the requested tasks. The web pages/responses may then be presented to the user by user applications such as the browser. Each user request is sent in the form of an IP packet directed to the desired system or application, with the IP packet including data identifying the desired tasks in the payload portion.

Internet 120 represents a data network providing connectivity between user systems 110-1 through 110-Z and cloud gateway 140. Internet 120 may encompass the world-wide connected Internet. Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by internet 120. When the packet contains content such as port numbers, which specifies an internal component such as target application and/or internal system, the packet may be directed to such application or internal system as well.

Various RFCs (request for comments) available from IETF Administration LLC, 1000 N West Street, Suite 1200, Wilmington, Del. 19801, provide additional detail of the operation of the TCP/IP environment as relevant to the operation of the embodiments described herein. Specifically, the manner in which IP operates and the general packet format used by IP are described in detail in a document referred to as RFC 791 entitled, "Internet Protocol". The document establishes the protocol relationships showing that TCP is implemented on top of IP in section 2.1 "Relation to Other Protocols", and the specific IP Header format is shown in section 3.1. Specifically, the 'protocol' field in 10th byte in set to decimal value of 6 per RFC 790 entitled "Assigned Numbers", as shown in section "ASSIGNED INTERNET PROTOCOL NUMBERS".

The TCP protocol is itself further described in RFC 793 entitled, "TRANSMISSION CONTROL PROTOCOL", with section "2.5. Relation to Other Protocols" reiterating the same information from RFC 791, including that Application Level protocols are on top of TCP. Section 3.1 "Header Format" there notes that the TCP header follows IP header, and further includes source port and destination port numbers, referred to as TCP ports.

The Abstract of RFC 2616 entitled, "Hypertext Transfer Protocol—HTTP/1.1" notes that HTTP is an application-level protocol. Section 4 there further describes the manner of encoding HTTP requests (noted in Appendix of the instant application and described in sections below).

Cloud gateway 140 represents an entry point to cloud infrastructure 130. Cloud gateway 140 may accept all Application Programming Interface (API) calls from user systems 110 to the applications/services hosted on different processing nodes in cloud infrastructure 130, direct the calls to various appropriate applications/services required to fulfill them and return the relevant results to user systems 110. Cloud gateway 140 may perform tasks such as authentication, authorization, load-balancing, billing, analytics, etc. In an embodiment, cloud gateway 140 may be implemented as Oracle Cloud Infrastructure API Gateway.

Processing nodes 160 may be implemented as corresponding server systems. Each server system represents a server, such as a web/application server, executing applications capable of performing tasks requested by users using user system 110. A server system receives a client request from a user system and performs the tasks requested in the user request. A server system may use data stored internally (for example, in a non-volatile storage/hard disk within the server system), external data (e.g., maintained in a data node) and/or data received from external sources (e.g., from the user) in performing the requested tasks. The server system then sends the result of performance of the tasks to the requesting user system (one of 110) as a corresponding response to the user request. The results may be accompanied by specific user interfaces (e.g., web pages) for displaying the results to the requesting user.

Each of processing nodes 160 has a fixed number of resources such as memory (RAM), CPU (central processing unit) cycles, non-volatile storage, etc. that can be allocated to (and accordingly used by) entities executing in the processing node. Other resources that may also be provided associated with the cloud infrastructure (but not specific to a node) include public IP (Internet Protocol) addresses, etc.

Utility system 170 represents a server such as web/application server that executes utility services for cloud infrastructure 130. Examples of utility services include but are not limited to key management service that manages authentication keys, data collector service that collects resource information from nodes 160, logging, etc.

Each data node 180 represents a data storage providing non-volatile storages facilitating storage and retrieval of data by applications executing in the other systems/nodes of cloud infrastructure 130. The non-volatile storage is often provided as a virtual storage mapped to respective non-volatile storage of data nodes 180. A single virtual storage may potentially be distributed across multiple data nodes 180. Conversely, non-volatile storages on a single data node 180 may provide virtual storages for multiple clouds. Each data node 180 may be implemented as block storage, file storage or object storage, as is well known in the relevant arts. Each data node 180 may accordingly be accessed using the appropriate interfaces, e.g. block storage may be provided as SCSI disks with the corresponding interface being SCSI protocol.

Each data node 180 of cloud infrastructure 130 may provide non-volatile storages for multiple applications/services hosted on different customer clouds. In such scenarios, a malicious attack on data in non-volatile storage of one application may lead to/result in disruption of other applications/services.

The manner in which data in non-volatile storages provided to clouds is protected is described below with examples.

3. Flowchart

Figure 2:
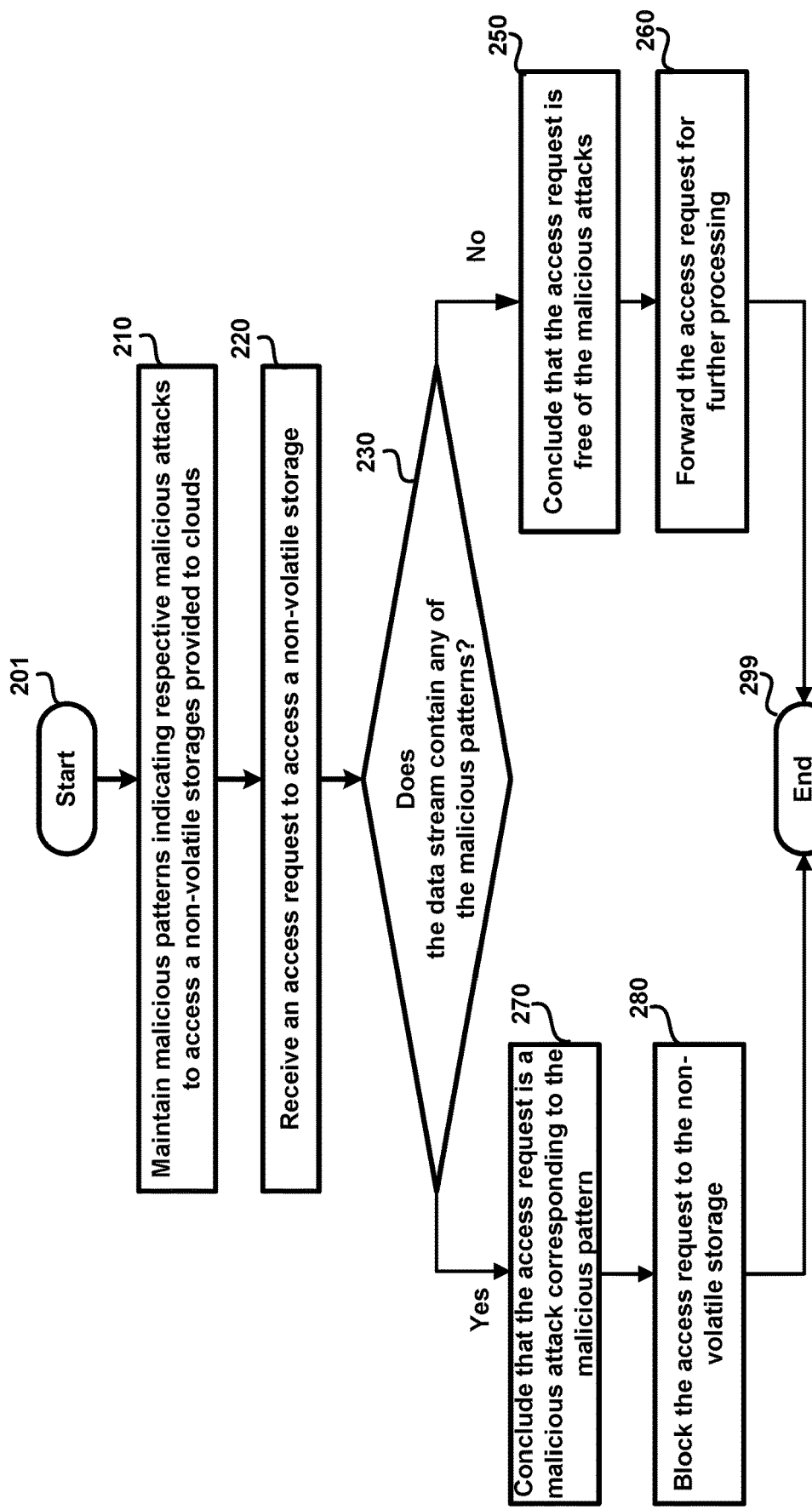
FIG. 2 is a flow chart illustrating the manner in which data in non-volatile storages provided to clouds is protected against malicious attacks according to an aspect of the present disclosure.

FIG. 2 is a flow chart illustrating the manner in which data in non-volatile storages provided to clouds in a cloud infrastructure is protected against malicious attacks according to an aspect of the present disclosure. The flowchart is described with respect to the utility system 170 of FIG. 1 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, utility system 170 maintains malicious patterns indicating respective malicious attacks to access non-volatile storages provided to clouds in the cloud infrastructure. A malicious pattern refers to an ordered sequence of bits, with each bit being in a corresponding position specified in the pattern. Each malicious pattern corresponds to a type of malicious attack. While the embodiments below are described as having a fixed number of bits with specific values in each of the positions, it should be understood that malicious patterns may include wild-cards and/or 'don't care value' positions in alternative embodiments.

In step 220, utility system 170 receives an access request from user system 110 to a non-volatile storage in the form of a data stream. A data stream is a contiguous sequence of bits representing the corresponding access request. Each access request may be for reading data from or writing data to non-volatile storages.

In step 230, utility system 170 checks whether the data stream contains any of the malicious patterns. A data stream is determined to contain a malicious pattern if the data stream has bits in corresponding positions as specified in the malicious pattern. If the data stream does not contain any of the malicious patterns, control passes to step 250 and to step 270 otherwise.

In step 250, utility system 170 concludes that the access request is free of the malicious attacks. Thus, utility system 170 forwards the access request for further processing as shown in step 260.

In step 270, utility system 170 concludes that the access request is a malicious attack corresponding to the malicious pattern. Thus, utility system 170 may take appropriate preventive action, for example, by blocking the access request to the non-volatile storage as shown in step 280. The flowchart ends in step 299.

While various steps above are described as being sequential for ease of understanding, it may be appreciated that some of the steps can be performed in parallel. For example, steps 220 and 230 may be performed in parallel; i.e., several access requests may be received and checked for existence of malicious patterns in parallel. It may also be appreciated that steps 230-280 would be repeated for each of the access requests received.

The description is continued with respect to an example implementation for extending the computing system of FIG. 1 in accordance with the features of FIG. 2.

4. Example Implementation

Figure 3:
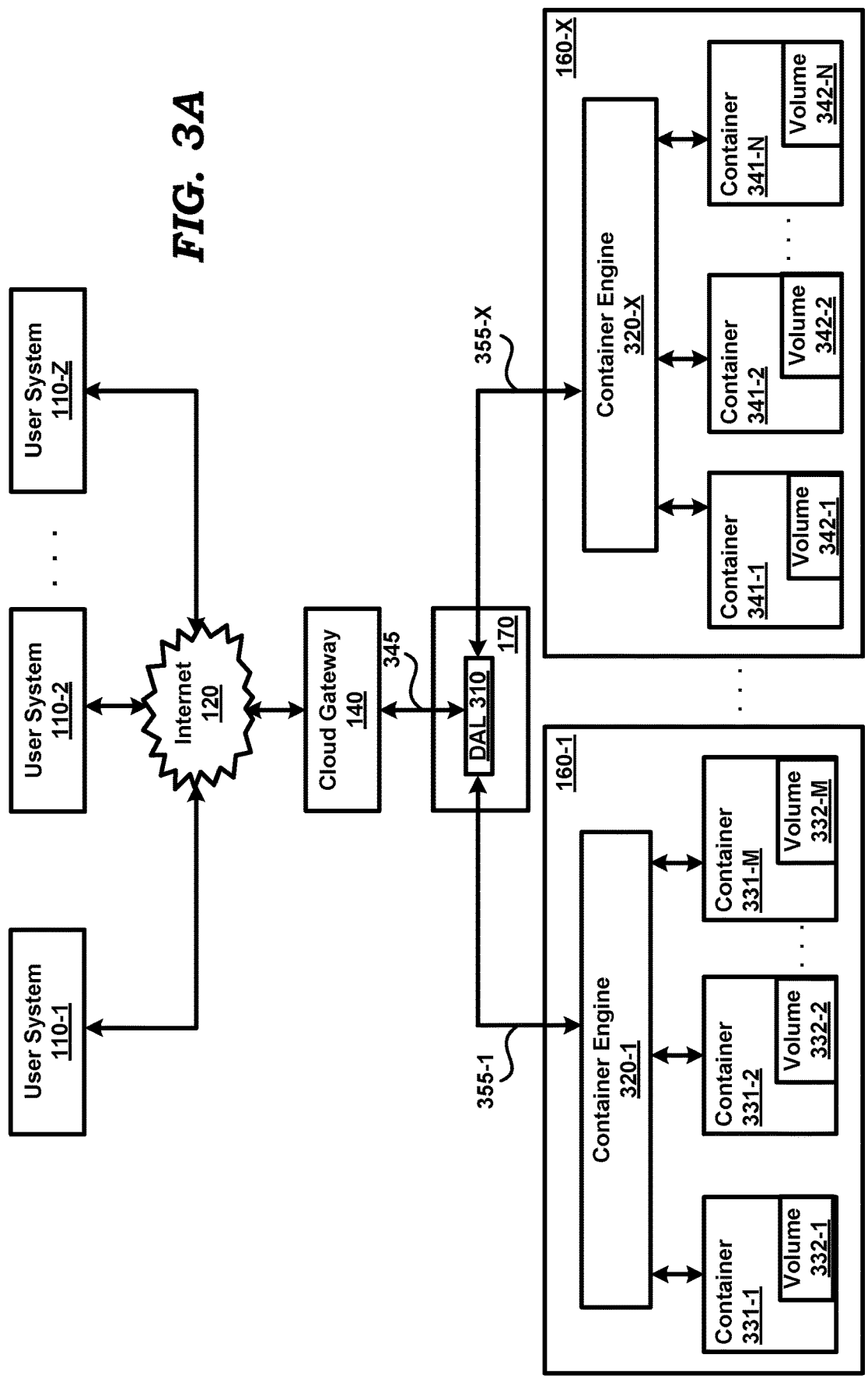
FIGS. 3A and 3B are block diagrams together illustrating an example implementation in accordance with the present disclosure.

FIGS. 3A and 3B are block diagrams together illustrating an example implementation in accordance with the present disclosure. Specifically, the block diagram of FIG. 3A is shown containing user systems 110-1 through 110-Z, internet 120, cloud gateway 140, utility system 170, DAL layer 310, communication paths 345, 355-1 through 355-X, and processing nodes 160-1 through 160-X. User systems 110, internet 120 and cloud gateway 140 respectively specify the corresponding blocks in FIG. 1 and the description is not repeated here for conciseness.

Representative processing node 160-1 is shown containing container engine 320-1, containers 331-1 through 331-M (M representing any integer) and volumes 332-1 through 332-M. Similarly, processing node 160-X is shown containing container engine 320-X, containers 341-1 through 341-N (N representing any integer), volumes 342-1 through 342-N.

FIG. 3B depicts some applications 360-1 through 360-N (wherein N represents an integer) executing in a representative container.

Each container 331/341 provides a virtual isolated computing machine based on resources of processing node 160. An isolated computing machine implies that each container has its own memory (RAM-view) space, and serious errors (e.g., fatal failure) in operation of one container do not impact the other containers (including the applications executing therein). Each container is generally provisioned associated with a corresponding resource definition which specifies the resources (memory size, processing power) required for/used by the container (for execution of applications) during its operation. Each processing node 160 may host containers provisioned potentially for different clouds. In an embodiment, container 331/341 is implemented as a Docker® Container.

Each application 360 receives access requests from user systems 110, which are forwarded to a respective volume in an appropriate form as suited by the interface requirements of the volume. The application then receives a response (in the form of one or more packets) indicating any error codes generated by the volume while processing the request. Application 360 forwards each response, including any error (status) code received, back to DAL layer 310 for further processing. It may be appreciated that responses to read requests may include the data requested by the corresponding user system 110.

Container engine 320 manages containers hosted in processing node 160 and the corresponding volumes provided to containers. Management entails tasks such as initialization, termination, and allocation of resources (e.g. transient memory/RAM, CPU cycles, etc.) to containers on processing node 160. Container engine 320 may provide APIs to create/delete containers and volumes, to communicate with containers, etc. Container engine 320 may also facilitate containers to access non-volatile storage through corresponding volumes. In an embodiment, container engine 320 is implemented as a Docker®Engine.

Though the description of above is provided with respect to containers, aspects of the present disclosure can be implemented with other logical machines such as virtual machines, which also provide for similar virtual isolated computing machines of the virtual infrastructure, as will be apparent to a skilled practitioner based on the disclosure provided herein. It may also be appreciated that containers may be hosted on virtual machines, which in turn may be hosted on processing node 160, as is well known in the relevant arts.

Each volume 332/342 represents a virtual unit of storage, mapped to a corresponding non-volatile storage based on data storages (external to node 160) of cloud infrastructure, and provided to applications/services running within containers. Container engine 320 may map the volumes to the respective non-volatile storage. The data in each volume may potentially be distributed across multiple data nodes. Alternatively, or in addition, a volume on a processing node 160 may be mapped to non-volatile storage of the node itself. The lifecycle of a volume may correspond to the lifecycle of the container for which it is provided. Alternatively, a volume may exist independent of the container. Several volumes provided as part of different clouds may be mapped to non-volatile storages on a single data node. In an embodiment, each volume is implemented as a Docker® Volume.

Although in FIG. 3A, a container is shown as being provided with a single volume, a container may be provided with several volumes, as will be apparent to a skilled practitioner. A specific volume may be shared by several containers, as is also well known in the relevant arts.

DAL layer 310 receives access requests from and sends respective responses to user systems 110 via cloud gateway 140 on communication path 345, using data network (not shown) of cloud infrastructure 130. DAL layer 310 forwards the access requests to and receives respective responses (from applications 360 executing in containers) via container engine 320 on communication path 355, also using data network of cloud infrastructure 130. Each of the requests/responses is represented as a corresponding data stream embodied in a respective packet.

In an embodiment, communication on communication paths 345 and 355 may be based on REST (Representational State Transfer) API and implemented using Python SDK (Software Development Kit).

DAL layer 310 operates to prevent malicious attacks on non-volatile storage provided to clouds in cloud infrastructure 130. DAL layer 310 examines access requests received from user systems 110 for existence of malicious patterns indicating malicious attacks. DAL layer 310 inspects responses returned from containers for any errors while accessing non-volatile storages, as will be described below in detail. Although DAL layer 310 is shown hosted on utility system 170, DAL layer 310 may be implemented as part of cloud gateway 140 in alternative embodiments.

The description is continued to illustrate the manner in which DAL layer 310 operates to implement the flow-chart of FIG. 2 in an example implementation.

5. Dynamic Adaptive Learning Layer

Figure 4:
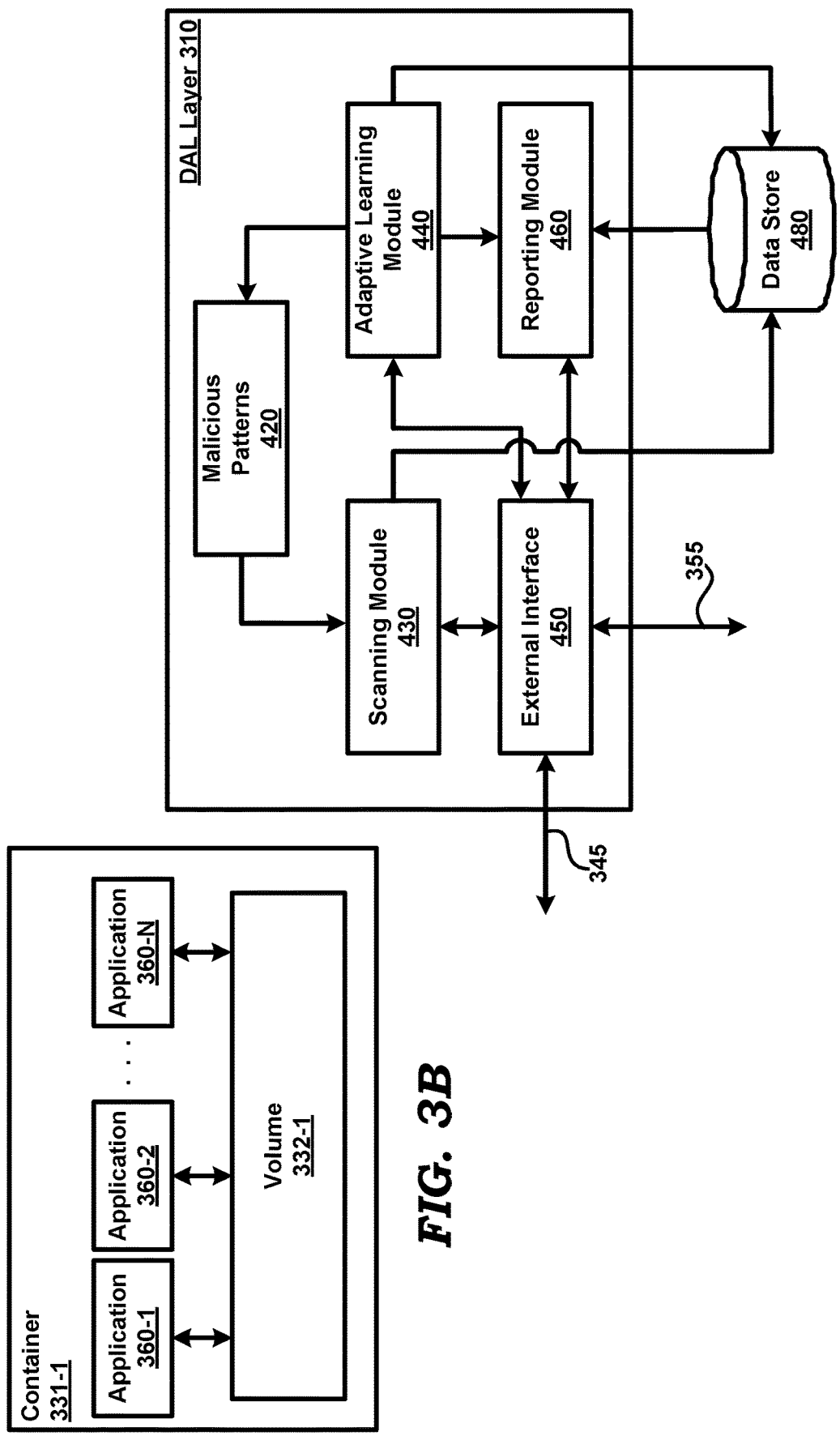
FIG. 4 is a block diagram illustrating further details of DAL layer in an embodiment.

FIG. 4 is a block diagram illustrating the details of implementation of DAL layer 310 operating in conjunction with data store 480. DAL layer 310 is shown containing external interface 450, malicious patterns 420, scanning module 430, adaptive learning module 440 and reporting module 460. Each block of FIG. 4 is described below in further detail.

External interface 450 facilitates the interaction of DAL layer 310 with cloud gateway 140 (on communication path 345) and container engine 320 on processing node 160 (on communication path 345). Specifically, external interface 450 receives the access requests from cloud gateway 140 and forwards them to scanning module 430. Similarly, external interface 450 sends requests to and receives responses from container engine 320.

Malicious patterns 420 is a list of patterns, whose presence in access requests, would indicate respective malicious attacks on non-volatile storages. The list may be provided by cloud vendor and/or each of customers utilizing the cloud infrastructure, and may be updated periodically to include new patterns.

Malicious patterns provided by cloud vendors may be based on access requests which the cloud vendors know that their volumes are susceptible to (based on data inferred from past malicious attacks) and/or access requests the containers/volumes in the cloud infrastructure cannot handle. Malicious patterns provided by customers may be based on access requests known to be never sent/made by legitimate applications hosted in corresponding clouds.

The list of malicious patterns may be loaded into the primary memory of DAL layer 310. Alternatively, malicious patterns 420 may be stored in data store 480. Malicious patterns 420 may be updated by adaptive learning module 440 as will be described in detail below.

Scanning module 430 receives access requests to non-volatile storages from cloud gateway 140 via external interface 450. Access requests may be initiated by corresponding processes in user systems 110 accessing applications hosted by customer clouds. Scanning module 430 checks whether data streams of access requests contain any data pattern of malicious patterns 420. Specifically, scanning module 430 may inspect the access requests for presence of values in certain fields of the access request based on information in malicious patterns 420. For example, a pattern in malicious patterns 420 may specify the combination of a certain customer and a certain volume as representing a malicious attack, for example, in case of read requests. Scanning module 430 may, thus, inspect the customer identifier and volume identifier field parameters of read requests in order to determine the presence of a malicious pattern. In case of write requests, the data pattern may be specified to be part of the data sought to be written as well.

If the data stream of an access request does not contain any of the malicious patterns, scanning module 430 concludes that the access request is free of the malicious attacks. Therefore, scanning module 430 forwards the access request to the respective non-volatile storage via container engine 320. Scanning module 430 may check for the existence of patterns in a known manner.

If, however, the data stream of an access request does contain any of the malicious patterns, scanning module 430 concludes that the access request is a malicious attack corresponding to the malicious pattern. Scanning module 430 therefore makes a corresponding entry in data store 480 for the event. In an embodiment, scanning module 430 communicates to cloud gateway 140 to block further access requests from the process.

Adaptive learning module 440 examines the packets returned as respective responses from non-volatile storages for the corresponding access requests. Specifically, adaptive learning module 440 checks for any error codes representing problems in data access to non-volatile storages. If there are any error codes in the response packets, adaptive learning module 440 makes a corresponding entry in data store 480 for the error code.

Adaptive learning module 440 also checks if the same error code (directed to the same customer cloud application) has been returned in responses for a threshold number of times in a pre-specified duration. If so, adaptive learning module 440 concludes that such access requests with the same error code contained a corresponding malicious attack. Adaptive learning module 440 extracts a common data pattern present in the access requests to indicate the malicious attack using AI/ML (artificial intelligence/machine learning) techniques. Adaptive learning module 440 adds the common data pattern to malicious patterns 420. Adaptive learning module 440 may maintain an internal buffer (not shown) to correlate the access requests to the respective error codes.

Adaptive learning module 440 communicates to cloud gateway 140 to block further access requests from the process. Adaptive learning module 440 may communicate to reporting module 460 to report the malicious attack. In an embodiment, adaptive learning module 440 may employ machine learning techniques to extract common data patterns.

Customers and/or cloud vendors may request for information about malicious attacks to storage. External interface 450 may forward such requests to reporting module 460. Reporting module 460 may retrieve the information corresponding to each customer from data store 480. Reporting module 460 may display the information in a web page (not shown). In addition, reporting module 460 may send notifications (e.g. via email/SMS) to cloud vendor and/or customers to notify about malicious attacks as and when such attacks occur.

Data store 480 may be implemented based on data nodes 180 and facilitates storage and retrieval of a collection of data by DAL layer 310. Data store 480 may be implemented as a database server using relational database technologies and accordingly provide storage and retrieval of data using structured queries such as SQL (Structured Query Language). Alternatively, or in addition, data store 480 may be implemented as a file server providing storage and retrieval of data in the form of files organized as one or more directories, as is well known in the relevant arts. In an embodiment, data store 480 is implemented as PostgreSQL database. An example schema for database tables of data store 480 is described below.

6. DAL Layer Data Store

Figure 5:
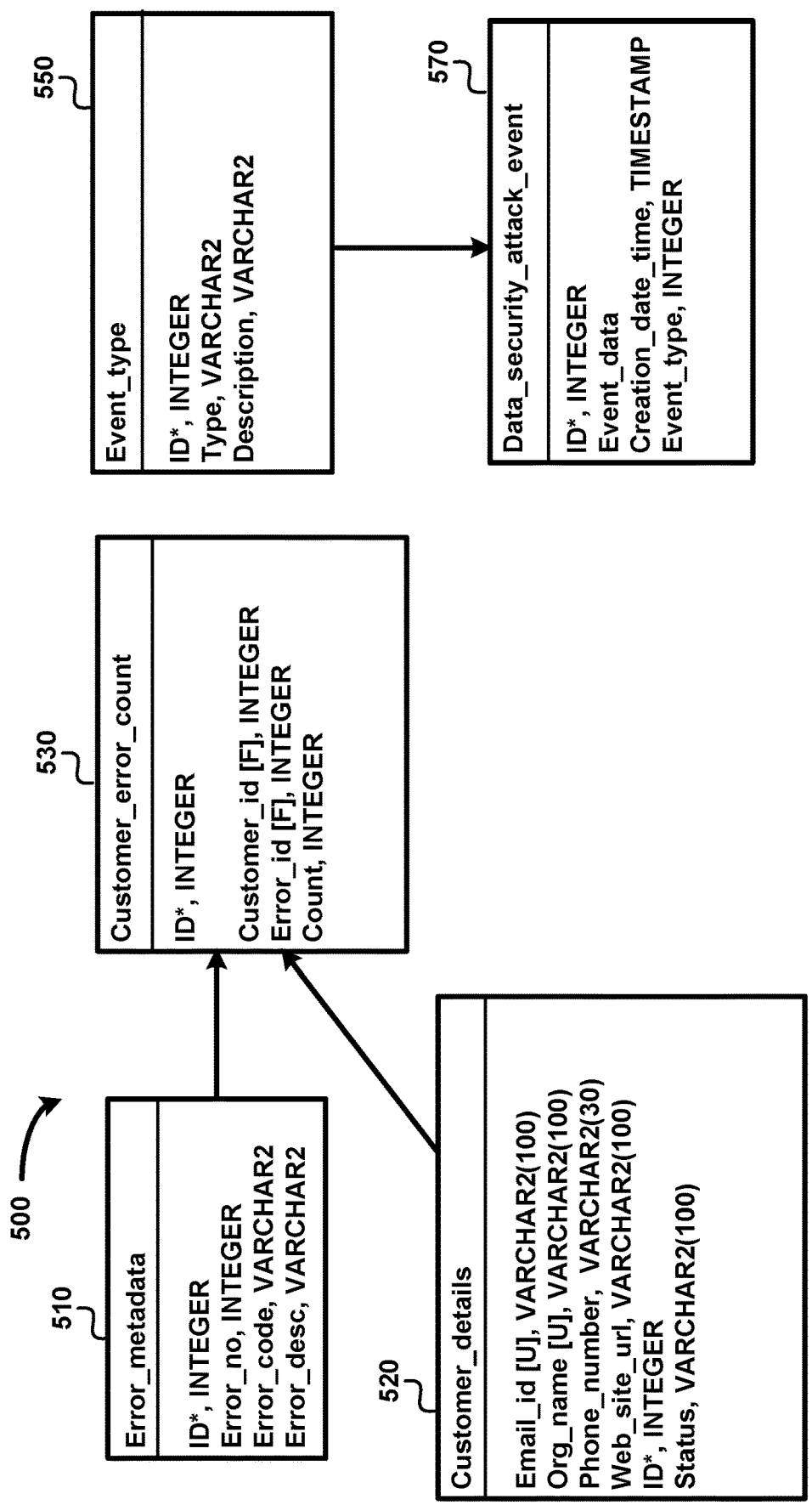
FIG. 5 depicts sample schema for DAL layer database in an embodiment.

FIG. 5 depicts sample schema for data store 480 in an embodiment. Specifically, schema 500 is shown containing 5 database tables (510, 520, 530, 550 and 570). Each table is shown as a corresponding box having the name of the table, the names of some of the columns/fields contained in the table and the corresponding data types. A * next to the column name indicates primary key of the table. An [F] next to the column name indicates foreign key in the table. A [U] next to the column name indicates unique key in the corresponding table, as is well known in the relevant arts.

Thus, schema 500 is shown containing 5 tables named error_metadata (510), customer_details (520), customer_error_count (530), event_type (550), and data_security_attack_event (570). Table customer_error_count is shown linked to tables customer_details (primary key ID of customer_details is the foreign key customer_id) and error_metadata (primary key ID of error_metadata is the foreign key error_id). Similarly, table data_security_attack_event is linked to table event_type by foreign key event_type.

Table error_metadata stores the errors returned from the non-volatile storage interface. In an embodiment, non-volatile storages are implemented as iSCSI (Internet Small Computer System Interface) disks and the non-volatile storage interface is implemented using the SCSI protocol, as is well known in the relevant arts. Thus, table error_metadata stores SCSI error codes and corresponding descriptions. Adaptive learning module 440 uses data stored in error_metadata table to classify the error returned from container engine 320.

Table customer_details stores the details of customers who have been provided virtual infrastructure in respective clouds in cloud infrastructure 130. In an embodiment, column ID in table customer_details corresponds to a unique identifier issued to a customer by the cloud vendor at the time of provisioning a cloud to the customer.

Table event_type indicates the type of events being tracked. In an embodiment, two types of events are tracked—pattern-match event (with respect to access requests received from user systems 110) and SCSI error (received in responses from non-volatile storages).

Table customer_error_count is used to keep track of count of errors for a specific customer. Adaptive learning module 440 inserts data into and retrieves data from this table. Reporting module 460 also retrieves data from this table.

Table data_security_attack_event stores the events corresponding to malicious attacks to access non-volatile storage. Scanning module 430 and adaptive learning module 440 insert rows into this table and reporting module 460 retrieves data from this table.

The manner in which the tables of FIG. 5 can be used will be clear from the below description, which also illustrates some of the above noted features of DAL layer 310 with respect to sample data.

7. Accessing Non-Volatile Storage

In the description below, it is helpful to assume that container 331-1 (named as 'container1') on processing node 160-1 is provided as part of a cloud provisioned to customer A (with ID 5f0af6c4-dba3-4c51-9190-81408a232ea6 and org_name 'org1'). Container 331-2 (named as 'container3') on processing node 160-1 is provided as part of a different cloud, provisioned to customer B (with ID ccbe96f5-4d90-4666-aac1-c793ea4dc7a6 and org_name 'org6'). Respective volumes 332-1 and 332-2 are mapped to non-volatile storages on the same data node 180-1 (not shown).

Figure 6:
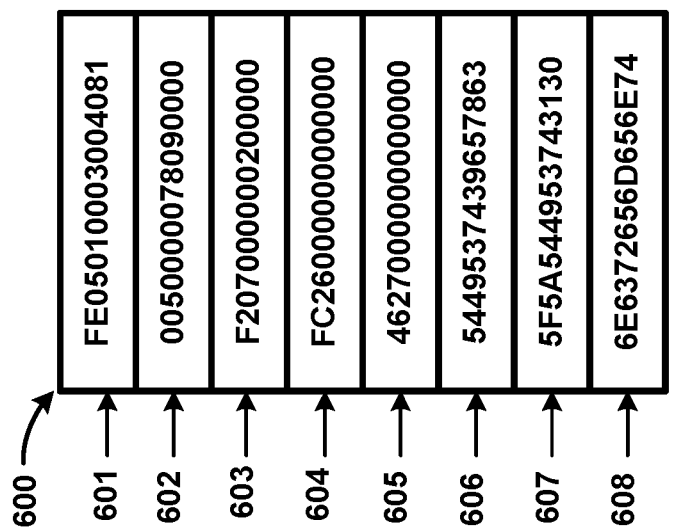
FIG. 6 depicts sample list of malicious patterns indicating malicious attacks in an embodiment.

FIG. 6 depicts sample malicious patterns indicating malicious attacks to access non-volatile storage. Specifically, table 600 is shown containing 8 rows (601-608). As noted above, the list of patterns may be stored in the form of a file in secondary memory of utility system 170 or may be stored in data store 480 as a database table. Each malicious pattern may correspond to a type of malicious attack. Each malicious pattern may correspond to a binary or a non-binary string. As is well known in the relevant arts, a binary string is a sequence of bytes whereas a non-binary string is a sequence of characters. Scanning module 430 may employ appropriate techniques to detect malicious patterns in data streams (access requests) corresponding to binary and non-binary strings, as will be apparent to a skilled practitioner.

In an embodiment, user systems 110 may read from/write to non-volatile storage in the form of files. Although the illustrative embodiment is described with respect to reading/writing data in the form of files, DAL layer 310 may be employed in other data access contexts also, as will also be apparent to a person skilled in the relevant art.

Figure 7A:
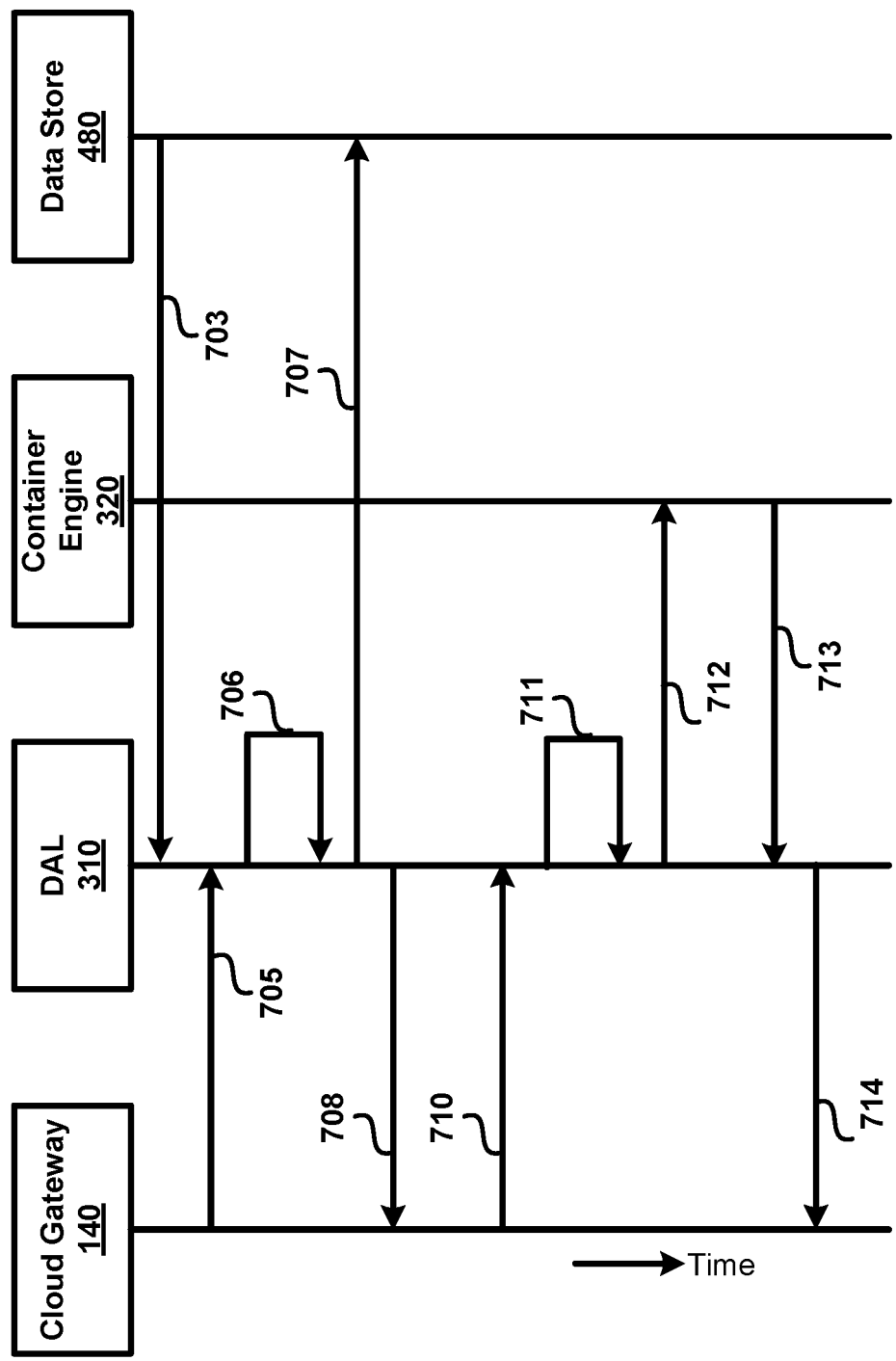
FIGS. 7A and 7B are sequence diagrams illustrating the manner in which DAL layer protects data in non-volatile storages in an embodiment.
Figure 7B:
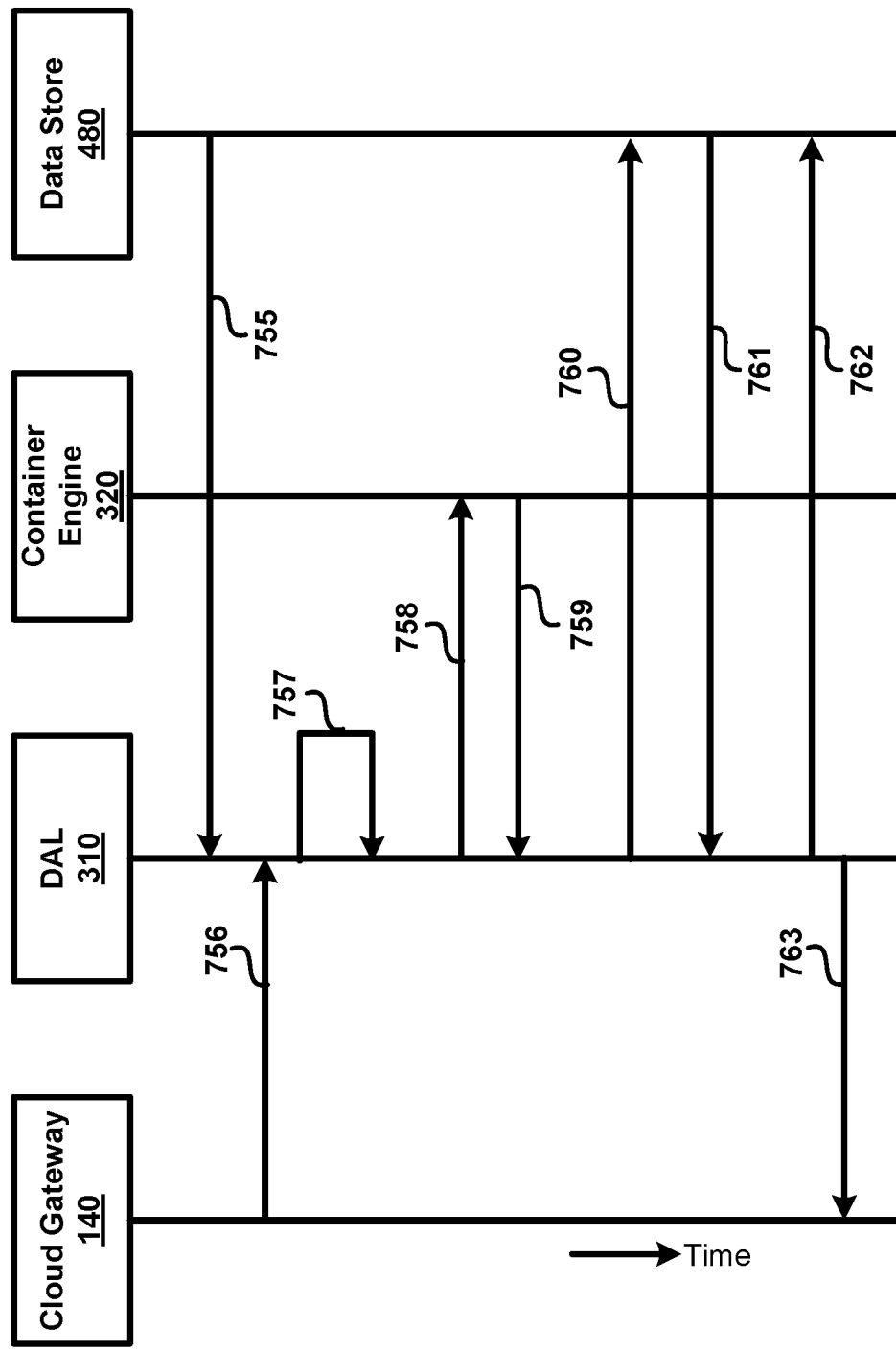

FIGS. 7A and 7B are sequence diagrams illustrating together the manner in which DAL layer 310 operates to protect data in non-volatile storages from malicious attacks. Broadly, FIG. 7A illustrates the manner in which DAL layer 310 checks for malicious patterns in access request data streams, and FIG. 7B illustrates the manner in which DAL layer 310 checks for SCSI error codes in responses from container engine 320 in an embodiment, as described below. For each access request, DAL layer 310 may perform any desired validations in any of known ways. For example, a check may be performed to confirm that a received request is from a valid customer based on customer identifiers in access requests, and also that the customer is an active customer (i.e., customer account is not suspended or terminated).

FIG. 7A is shown containing sequence of interactions for two write requests. DAL layer 310 loads data in table error_metadata (703) into primary memory (e.g. RAM). DAL layer 310 may load the data when the DAL layer application is initialized.

It is assumed that DAL layer 310 receives a first write request (705) to write data to volume 332-1 of container 1 (331-1 of FIG. 3, part of cloud provisioned to customer A) in the form of file named jar.exe (see code for Access Request A1 in the Appendix). DAL layer 310 (scanning module 430) checks (706) whether the data stream of the write request contains any of malicious patterns 420. DAL layer 310 finds that the file contains a malicious pattern (FC26000000000000), depicted in row 604 of table 600 of FIG. 6. Therefore, DAL layer 310 concludes that the write request indicates a malicious attack and blocks the write request. DAL layer 310 therefore inserts (707) a corresponding row into data_security_event_attack table with event_type as pattern-match event. DAL layer 310 communicates to cloud gateway 140 to block the write request (708) and prevents the process from further accessing any containers hosted on nodes in cloud infrastructure 130.

It may be appreciated that if the above access request (directed to cloud of customer A) was not prevented access by DAL layer 310, the malicious attack would have potentially rendered the non-volatile storages in data node 180-1 inaccessible/inoperative. Thus, applications/services hosted by customer B would have been disrupted since the volumes provided as part of clouds to customer A and customer B both reside on non-volatile storage on data node 180-1.

Now, it is assumed that DAL layer 310 receives a second write request (710) to write data to volume 332-1 of container1 (331-1 of FIG. 3) in the form of a file named git.exe (see code for Access Request A2 in the Appendix). DAL layer 310 checks (711) whether the data stream of the write request contains a malicious pattern. DAL layer 310 does not find any match. DAL layer 310 concludes that the write request is free of malicious attacks and forwards the request (712) to container engine 320. Container engine 320 in turn writes the file in the specified location in non-volatile storage (on data node 180-1) corresponding to volume 332-1 of container1 using SCSI interface. Container engine 320 returns a status (success) code (713) to DAL layer 310. DAL layer 310 returns the response (714) to cloud gateway 140, indicating that the write request has been successful.

The description is continued to illustrate the manner in which DAL layer 310 adds new patterns indicating malicious attacks, by inspecting SCSI error codes in response packets returned from non-volatile storage in an embodiment.

8. Adding New Patterns

FIG. 7B illustrates the manner in which DAL layer 310 may add new patterns to malicious patterns 420 in an embodiment. As noted above, DAL layer 310 loads data in table error_metadata (755) into primary memory (e.g. RAM).

DAL layer 310 receives an access request (756) directed to applications in cloud provisioned to customer A to read data. Scanning module 430 checks (757) whether the data stream of the access request contains any of the malicious patterns indicating malicious attacks. Scanning module 430 does not find any match (e.g. the combination of customer identifier and volume identifier is not present in the access request in the corresponding fields). Scanning module 430 concludes that the access request is free of malicious attacks and forwards the request (758) to container engine 320. It is assumed that the access request is a read request that seeks to read from a file in a volume (/dev/sdx corresponding to volume 332-2) that customer A is not authorized to access (see code for Access Request B1 in the Appendix). Therefore, when container engine 320 tries to read from the specified volume, SCSI error (error number 22, error code EINVAL) is returned from the non-volatile storage.

Container engine 320 returns the SCSI error code (759) to DAL layer 310. As noted above, the response packets from non-volatile storages (received via container engine 320) are examined by adaptive learning module 440 of DAL layer 310. Adaptive learning module 440 inserts (760) a row corresponding to the error code in customer_error_count table in data store 480 to start monitoring additional responses that may generate the same error code as a basis for determining a new malicious attack. It should be appreciated that no common data pattern may be found in the corresponding access requests (in which case the errors are considered not to be due to malicious attacks), or multiple patterns may be found over time (in which case the corresponding number of malicious attacks may be concluded to be present).

Adaptive learning module 440 retrieves (761) the count of same error code in packets arriving in responses from non-volatile storage, corresponding to access requests directed to applications hosted by the same cloud customer.

If the count does not exceed a threshold value (e.g. 3 times), DAL layer 310 does not take any further action. However, a malicious process may retry the read request leading to the same error code in subsequent response packets. Thus, when DAL layer 310 determines that the same error code has been returned in responses for a threshold number of times, DAL layer 310 concludes that such access requests with the same error code contained the new malicious attack. DAL layer 310 inserts a corresponding row into data_security_event_attack table (762) with event_type as SCSI error, and also communicates (763) to cloud gateway 140, indicating that no further access requests will be permitted for the process. Cloud gateway 140 may thereafter block access requests from that process.

Adaptive learning module 440 keeps track of access requests and corresponding error codes in response packets (in an internal buffer), and attempts to extract a common data pattern from access requests when the same error code is received in response packets. For example, when a number of such responses with the same error code exceeds a threshold in a prespecified duration, the corresponding access requests (causing the responses with that error code) may be examined for a common data pattern in appropriate fields. If such a common data pattern is found, DAL layer 310 adds the common data pattern to malicious patterns 420.

Referring to the read request illustrated in Access Request B1 in the Appendix, adaptive learning module 440 may extract the common data pattern as the combination of customer id '5f0af6c4-dba3-4c51-9190-81408a232ea6' and the volume '/dev/sdx', and add the common data pattern (e.g. '5f0af6c4-dba3-4c51-9190-81408a232ea6;/dev/dsx') to malicious patterns 420. Thus, future read requests with the combination of the customer id and volume as specified in the common data pattern may be blocked by scanning module 430. Write requests to the same volume by the same customer may also be blocked.

Adaptive learning module 440 may employ AI/ML techniques for determining common data patterns constituting part of malicious access requests. In such a scenario, an AI/ML model is first trained with many access request (order of many thousands which return error codes at non-volatile storages). Once trained, the AI/ML model may be able to detect new data patterns in access requests representing malicious attacks. In general, even such models generally conclude a finding of a new malicious attack only after some threshold number of same error code is returned while processing access requests having the same pattern.

Although the above illustration shows SCSI error being generated when an access request is directed to a volume not belonging to a customer, it may be appreciated that SCSI errors may also be generated when access requests are directed to volumes not accessible by a particular application of a customer. For example, customer A may host applications APP1 and APP2 with the application storages provisioned in volumes V1 and V2 respectively. Thus, when an access request directed to APP1 attempts to read data from volume V2, a SCSI error may be generated and the same may treated as being indicative of a potential malicious attack.

It may also be appreciated that while the above illustration extracts a combination of customer identifier and volume identifier as the common data pattern, there may be values in other fields (or files in the case of write requests) of the access request that may be included as part of the common data pattern, as will be apparent to a skilled practitioner.

Code for Access Request B2 in the Appendix illustrates a read request trying to get a file named git.exe from container1. The file is located in volume 332-1 provisioned to container 331-1 (part of cloud provided to customer A and accessible by the application) and hence the process is permitted to get the file. Therefore, container engine 320 gets the file from the specified in the read request and returns the file successfully.

Code for Access Request B3 in the Appendix illustrates a read request trying to read from a file that does not exist (xvda10) in the specified directory and the corresponding SCSI error returned in an embodiment. Specifically, read request is shown trying to open a file from volume 332-2 provisioned to container 331-2 (part of cloud provided to customer B). In this case, SCSI error (error number 2, error code ENOENT) is returned from the non-volatile storage.

Code for Access Request B4 in the Appendix illustrates a read request trying to write data to a directory and the corresponding SCSI error returned in an embodiment. Specifically, read request is shown trying to open a file from volume 332-2 provisioned to container 331-2 (part of cloud provided to customer B). In this case, SCSI error (error number 21, error code EISDIR) is returned from the non-volatile storage.

In this manner, DAL layer 310 may operate to protect data in non-volatile storages provided to clouds from malicious attacks. All such events and errors corresponding to malicious attacks may be suitably communicated to cloud vendor and/or customer via a dashboard for convenient viewing as described below.

9. Sample Dashboards

FIGS. 8A and 8B depict sample dashboards displayed by DAL layer 310 on a web page in an embodiment. The web page may be provided as part of DAL layer 310 hosted on utility system 170.

The dashboard of FIG. 8A is shown containing events corresponding to malicious attacks. Specifically, table 800 is shown containing 15 rows (810-824). Each row specifies the following:

1. The name of the container to which the access request was directed (column 801), 2. The corresponding malicious pattern in the access request data stream (column 802), 3. The name of the specific file of the access/write request which contained the malicious pattern (column 803), and 4. The event date time (column 804).

For example, row 810 represents the event corresponding to the first write request (705) described in FIG. 7A.

The dashboard of FIG. 8B is shown containing information about errors returned from container engine 320. Specifically, table 830 is shown containing 3 rows (831-833). Each row specifies the following:

1. The name of the customer organization (column 805) corresponding to the cloud from where the malicious access request originated and resulted in the error,
2. The SCSI error code returned in the response (column 806),
3. The count of errors corresponding to a particular error code for a customer (column 807), and
4. The date time when the number of attacks met the threshold (column 808).

For example, row 832 represents the error corresponding to the read requests such as the one (756) described in FIG. 7B, which are described above to have generated the same error code a threshold number of times. Similarly, rows 831 and 833 represent the errors generated corresponding to the read requests such as the ones depicted in Access Requests B3 and B4 in the Appendix respectively.

In this manner, DAL layer 310 operates to protect data in non-volatile storages provided to clouds from malicious attacks.

It may be appreciated that DAL layer 310 operates to provide continuous security to data in non-volatile storage provided to clouds. It is assumed that after successful authentication/authorization in a respective cloud infrastructure, an attacker may introduce a malicious process through applications hosted by customers in clouds. By potentially checking for existence of malicious patterns in each and every access request, DAL layer 310 can provide continuous security to non-volatile storage.

It may also be appreciated that DAL layer 310 adds new patterns by analyzing errors returned while accessing non-volatile storage.

Further, when DAL layer 310 detects a malicious process trying to access non-volatile storage through one container, DAL layer 310 immediately blocks the access from the process, thus protecting other containers from disruption.

The events and errors are notified to customers and/or cloud vendors so that appropriate corrective action may be taken.

In addition, although the illustrative embodiment is described with respect to containers and volumes, features of the present disclosure may be employed in other types of virtual infrastructure and corresponding data storages in cloud infrastructure also, as will be apparent to a skilled practitioner based on the disclosure provided herein.

It should be also appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 9:
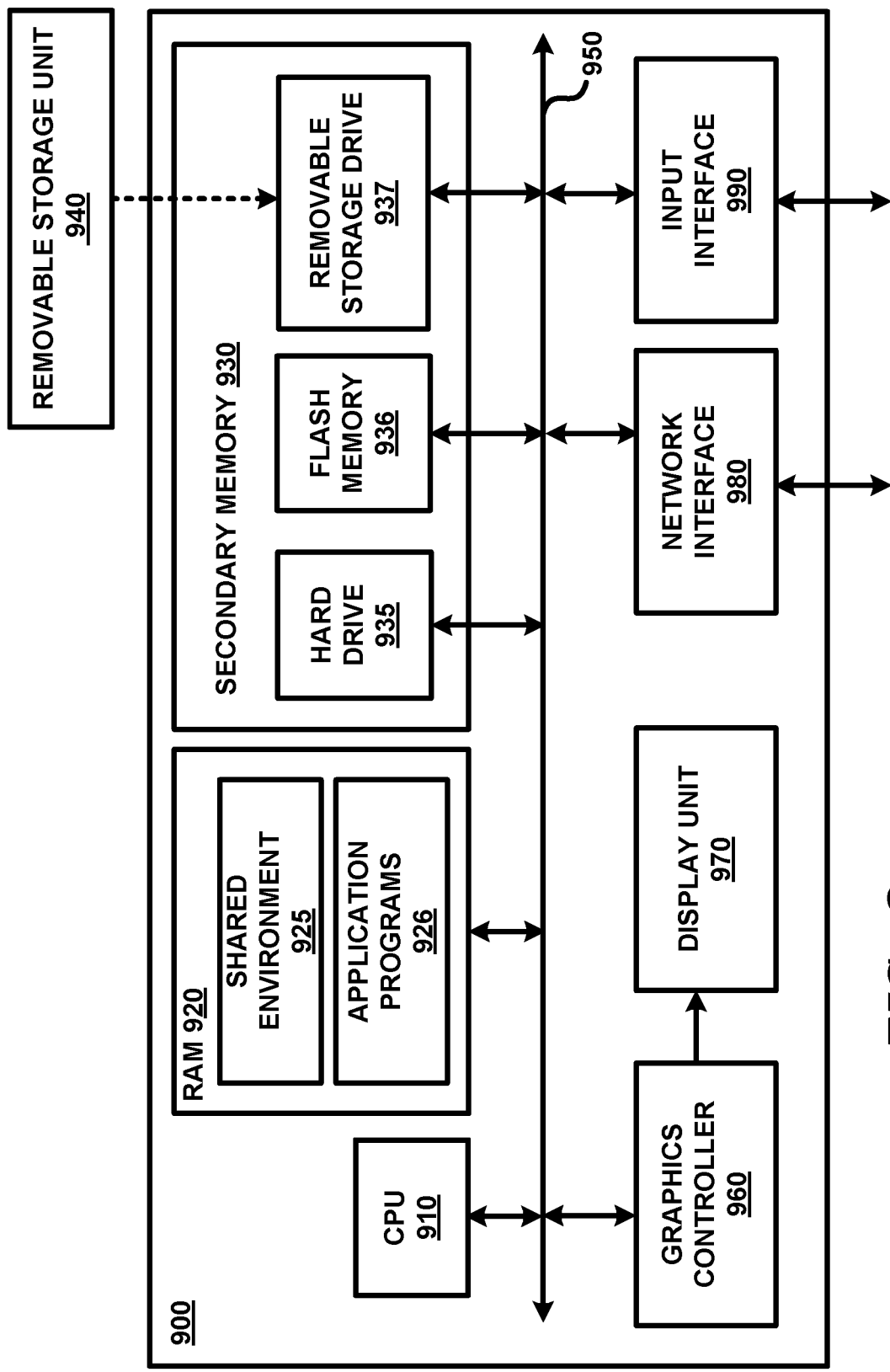
FIG. 9 is a block diagram illustrating the details of a digital processing system in which various aspects of the present disclosure are operative by execution of appropriate executable modules.

FIG. 9 is a block diagram illustrating the details of digital processing system 900 in which various aspects of the present disclosure are operative by execution of appropriate executable modules. Digital processing system 900 may correspond to utility system 170.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or other user programs 926 (such as other applications, DBMS, etc.). Shared environment 925 contains software programs such as device drivers, operating systems, virtual machines, containers, etc., which provide a (shared) run time environment for execution of other/user programs. A combination of such software programs, as applicable in the pertinent computing environment, for execution of programs including those specifically implementing the features noted above, may be referred to as system/infrastructure utilities.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) and may be used to provide inputs. Network interface 980 provides connectivity to a network (e.g., using Internet Protocol), and may be used to communicate with cloud gateway 140 (of FIG. 1) connected to the networks (120).

Secondary memory 930 may contain hard drive 935, flash memory 936, and removable storage drive 937. Secondary memory 930 may store the data (for example, data portions shown in FIG. 6) and software instructions (for example, for implementing the various features of the present disclosure as shown in FIG. 2, etc.), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge. One or more of such storage media, potentially stored in different systems, may be employed to store the instructions and data to provide various features described above.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX

```
Access Request A1
curl http://127. 0. 0. 1:8000/putfileincontainer -H "Content-Type: application/json" -d
'{"file_path": "C:\\Data\\Learn\\DockerAndKubernetes\\input\\jar. exe", "container_name":
"container1"}'
{
"message": "A malicious pattern is found in the file data. Event has been reported"
}
Access Request A2
curl http://127. 0. 0. 1:8000/putfileincontainer -H "Content-Type: application/json" -d
'{"file_path": "C:\\Data\\Learn\\DockerAndKubernetes\\inpt\\git. exe", "container_name":
"container1"}'
{
"status": "File has been put in container successfully. "
}
Access Request B1
curl http://127.0.0.1:8000/seekfilefromcontainer -H "Customer-ID: 5f0af6c4-dba3-4c51-9190-
81408a232ea6" -H "Content-Type: application/json" -d '{"file_name": "abc.exe",
"container_name": "container 1", "volume": "/dev/sdx"}'
{
"error": "data security attack has been tried against container1"
}
Access Request B2
curl http://127.0.0.8000/getfilefromcontainer -H "Customer-ID: 5f0af6c4-dba3-4c51-9190-
81408a232ea6" -H "Content-Type:application/json" -d '{destination_file_path":
"C:\\Data\\output", "file_name":"git.exe", "container_name": "container1"}'
{
"status": "File has been retrieved from container to local folder successfully. "
}
Access Request B3
curl http://127. 0. 0. 1:8000/openfilefromcontainer -H "Customer-ID: ccbe96f5-4d90-4666-aac1-
c793ea4dc7a6" -H "Content-Type: application/json" -d '{"file_name": "/dev/xvda10"}'{
"error": "data security attack has been tried against container3"
}
Access Request B4
curl http://127. 0. 0. 1:8000//writedatatocontainer -H "Customer-ID: ccbe96f5-4d90-4666-aac1-
c793ea4dc7a6" -H "Content-Type: application/json" -d '{"file _name": "/d
ev", "text": "somedata"}'{
"error": "data security attack has been tried against container3"
}
```

What is claimed is:

1. A method performed in a cloud infrastructure serving customers with respective clouds, wherein each customer is identified by a corresponding customer identifier, the method comprising:

maintaining a plurality of malicious patterns indicating respective malicious attacks to access non-volatile storages provided to clouds in the cloud infrastructure, wherein a set of malicious patterns of the plurality of malicious patterns specifies as malicious attacks access requests by respective customers with corresponding customer identifiers to corresponding non-volatile storages with corresponding storage identifiers;

receiving an access request in the form of a data stream specified following TCP (Transmission Control Protocol) port numbers in a TCP/IP (Transmission Control Protocol/Internet Protocol) packet, wherein the data stream contains a customer identifier of a first customer and a storage identifier of a first non-volatile storage indicating that the access request is from the first customer directed to the first non-volatile storage;

checking whether the data stream contains a malicious pattern of the plurality of malicious patterns by examining whether the set of malicious patterns indicates that access of the first non-volatile storage by the first customer is a malicious attack, wherein the access request is deemed to contain the malicious pattern when the combination of the customer identifier and the storage identifier is contained in a first malicious pattern of the set of malicious patterns, if the data stream does not contain the malicious pattern, forwarding the access request to the first non-volatile storage; and if the data stream does contain the malicious pattern, concluding that the access request is a malicious attack corresponding to the malicious pattern, and blocking the access request to the first non-volatile storage.

2. The method of claim 1, further comprising:

forwarding a first plurality of access requests to the non-volatile storages, and receiving a first plurality of packets from the non-volatile storages as respective responses, each of the first plurality of access requests specifying a customer identifier and a storage identifier of the non-volatile storage in the data stream specified following TCP port numbers in the corresponding TCP/IP packet;

examining the first plurality of packets to determine if there exists a new malicious attack in the first plurality of access requests; and adding to the set of malicious patterns, a common data pattern present in data streams specified following TCP port numbers in the TCP/IP packets representing those of the first plurality of access requests which are determined to have the new malicious attack, wherein the common data pattern includes the customer identifier and the storage identifier of the non-volatile storage.

3. The method of claim 1, wherein the non-volatile storages comprise the first non-volatile storage and a second non-volatile storage respectively provided to the first customer and a second customer, wherein the set of malicious patterns indicates that access of the first non-volatile storage by the second customer is a malicious attack, wherein a first access request indicating that the second customer seeks to access data in the first non-volatile storage is blocked in view of the set of malicious patterns indicating that accesses of the first non-volatile storage by the second customer is a malicious attack, wherein a second access request indicating that the first customer seeks to access data in the second non-volatile storage is forwarded upon absence of the set of malicious patterns indicating that accesses of the first customer to the second non-volatile storage is not a malicious attack.

4. The method of claim 3, wherein a first logical machine is provided to the first customer and a second logical machine is provided to the second customer, wherein each of the first logical machine and the second logical machine is a corresponding container of a different cloud, wherein the first non-volatile storage and the second non-volatile storage are provisioned as respective virtual storages based on a first data storage of the cloud infrastructure, wherein each of the first logical machine and the second logical machine provides a respective virtual isolated computing machine for execution of applications, wherein the data stream specifies the identifier of the container in the data stream specified following port numbers.

5. The method of claim 2, wherein the examining comprises checking whether an error code representing problem in data access exists in a first number of responses, wherein the first number equals a threshold, wherein the new malicious attack is concluded to be present if the error code exists in the first number of responses, and wherein the common data pattern in the access requests causing the first number of responses is added to the set of malicious patterns upon the conclusion.

6. The method of claim 5, wherein the examining is performed using Artificial Intelligence/Machine Learning (AI/ML).

7. The method of claim 1, wherein the access request is a write request specifying a file name specified following the port numbers, the file name specifying a file which contains data to be written, wherein the checking comprises examining the data to be written for the malicious pattern.

8. A server system in a cloud infrastructure comprising:

one or more memories for storing instructions; and one or more processors, wherein execution of the instructions by the one or more processors causes the server system to perform the actions of:

maintaining a plurality of malicious patterns indicating respective malicious attacks to access non-volatile storages provided to clouds in the cloud infrastructure, wherein the maintaining comprises:

receiving a first plurality of access requests directed to the non-volatile storages, each of the plurality of access requests being in the form of a data stream specified following TCP (Transmission Control Protocol) port numbers in a TCP/IP (Transmission Control Protocol/Internet Protocol) packet, each of the first plurality of access requests specifying a customer identifier and an identifier of the non-volatile storage in the data stream specified following TCP port numbers in the corresponding TCP/IP packet;

forwarding the first plurality of access requests to the non-volatile storages, and receiving a first plurality of packets from the non-volatile storages as respective responses;

examining the first plurality of packets to determine if there exists a new malicious attack in the first plurality of access requests; and adding to the plurality of malicious patterns, a common data pattern present in data streams specified following TCP port numbers in the TCP/IP packets representing those of the first plurality of access requests which are determined to have the new malicious attack, wherein the common data pattern includes the customer identifier and the identifier of the non-volatile storage;

receiving another access request directed to a first non-volatile storage, the another access request being in the form of a first data stream specified following TCP (Transmission Control Protocol) port numbers in a TCP/IP (Transmission Control Protocol/Internet Protocol) packet;

checking whether the first data stream contains a malicious pattern of the plurality of malicious patterns, if the first data stream does not contain the malicious pattern, forwarding the another access request to the first non-volatile storage; and if the first data stream does contain the malicious pattern, concluding that the another access request is a malicious attack corresponding to the malicious pattern, and blocking the another access request to the first non-volatile storage.

9. The server system of claim 8, wherein the non-volatile storages comprise the first non-volatile storage and a second non-volatile storage respectively provided to a first logical machine and a second logical machine, wherein the first non-volatile storage and the second non-volatile storage are provisioned as respective virtual storages based on a first data storage of the cloud infrastructure, wherein each of the first logical machine and the second logical machine provides a respective virtual isolated computing machine for execution of applications.

10. The server system of claim 9, wherein each of the first logical machine and the second logical machine is a corresponding container of a different cloud, wherein the data stream specifies the identifier of the container in the data stream specified following port numbers.

11. The server system of claim 9, wherein the examining comprises checking whether an error code representing problem in data access exists in a first number of responses, wherein the first number equals a threshold, wherein the new malicious attack is concluded to be present if the error code exists in the first number of responses, and wherein the common data pattern in the access requests causing the first number of responses is added to the plurality of malicious patterns upon the conclusion.

12. The server system of claim 11, wherein the examining is performed using Artificial Intelligence/Machine Learning (AI/ML).

13. The server system of claim 8, wherein the another access request is a write request specifying a file name specified following the port numbers, the file name specifying a file which contains data to be written, wherein the checking comprises examining the data to be written for the malicious pattern.

14. One or more non-transitory machine readable mediums storing one or more sequences of instructions wherein execution of the one or more instructions by one or more processors of a server system in a cloud infrastructure serving customers with respective clouds, wherein each customer is identified by a corresponding customer identifier, causes the server system to perform the actions of:

maintaining a plurality of malicious patterns indicating respective malicious attacks to access non-volatile storages provided to clouds in the cloud infrastructure, wherein a set of malicious patterns of the plurality of malicious patterns specifies as malicious attacks access requests by respective customers with corresponding customer identifiers to corresponding non-volatile storages with corresponding storage identifiers;

receiving an access request in the form of a data stream specified following TCP (Transmission Control Protocol) port numbers in a TCP/IP (Transmission Control Protocol/Internet Protocol) packet, wherein the data stream contains a customer identifier of a first customer and a storage identifier of a first non-volatile storage indicating that the access request is from the first customer directed to the first non-volatile storage;

checking whether the data stream contains a malicious pattern of the plurality of malicious patterns by examining whether the set of malicious patterns indicate that access of the first non-volatile storage by the first customer is a malicious attack, wherein the access request is deemed to contain the malicious pattern when the combination of the customer identifier and the storage identifier is contained in a first malicious pattern of the set of malicious patterns, if the data stream does not contain the malicious pattern, forwarding the access request to the first non-volatile storage; and if the data stream does contain the malicious pattern, concluding that the access request is a malicious attack corresponding to the malicious pattern, and blocking the access request to the first non-volatile storage.

15. The one or more non-transitory machine readable mediums of claim 14, further comprising:

forwarding a first plurality of access requests to the non-volatile storages, and receiving a first plurality of packets from the non-volatile storages as respective responses, each of the first plurality of access requests specifying a customer identifier and a storage identifier of the non-volatile storage in the data stream specified following TCP port numbers in the corresponding TCP/IP packet;

examining the first plurality of packets to determine if there exists a new malicious attack in the first plurality of access requests; and adding to the set of malicious patterns, a common data pattern present in data streams specified following TCP port numbers in the TCP/IP packets representing those of the first plurality of access requests which are determined to have the new malicious attack, wherein the common data pattern includes the customer identifier and the storage identifier of the non-volatile storage.

16. The one or more non-transitory machine readable mediums of claim 14, wherein the non-volatile storages comprise the first non-volatile storage and a second non-volatile storage respectively provided to the first customer and a second customer, wherein the set of malicious patterns indicate that access of the first non-volatile storage by the second customer is a malicious attack, wherein a first access request indicating that the second customer seeks to access data in the first non-volatile storage is blocked in view of the set of malicious patterns indicating that accesses of the first non-volatile storage by the second customer, wherein a second access request indicating that the first customer seeks to access data in the second non-volatile storage is forwarded upon absence of the set of malicious patterns indicating that accesses of the first customer to the second non-volatile storage is malicious attack.

17. The one or more non-transitory machine readable mediums of claim 16, wherein a first logical machine is provided to the first customer and a second logical machine is provided to the second customer, wherein each of the first logical machine and the second logical machine is a corresponding container of a different cloud, wherein the first non-volatile storage and the second non-volatile storage are provisioned as respective virtual storages based on a first data storage of the cloud infrastructure, wherein each of the first logical machine and the second logical machine provides a respective virtual isolated computing machine for execution of applications, wherein the data stream specifies the identifier of the container in the data stream specified following port numbers.

18. The one or more non-transitory machine readable mediums of claim 15, wherein the examining comprises checking whether an error code representing problem in data access exists in a first number of responses, wherein the first number equals a threshold, wherein the new malicious attack is concluded to be present if the error code exists in the first number of responses, and wherein the common data pattern in the access requests causing the first number of responses is added to the set of malicious patterns upon the conclusion.

19. The one or more non-transitory machine readable mediums of claim 18, wherein the examining is performed using Artificial Intelligence/Machine Learning (AI/ML), wherein the access request is a write request specifying a file name specified following the port numbers, the file name specifying a file which contains data to be written, wherein the checking comprises examining the data to be written for the malicious pattern.

20. A server system in a cloud infrastructure serving customers with respective clouds, wherein each customer is identified by a corresponding customer identifier, said server system comprising:

one or more memories for storing instructions; and one or more processors, wherein execution of the instructions by the one or more processors causes the server system to perform the actions of:

maintaining a plurality of malicious patterns indicating respective malicious attacks to access non-volatile storages provided to clouds in the cloud infrastructure, wherein a set of malicious patterns of the plurality of malicious patterns specifies as malicious attacks access requests by respective customers with corresponding customer identifiers to corresponding non-volatile storages with corresponding storage identifiers;

receiving an access request in the form of a data stream specified following TCP (Transmission Control Protocol) port numbers in a TCP/IP (Transmission Control Protocol / Internet Protocol) packet, wherein the data stream contains a customer identifier of a first customer and a storage identifier of a first non-volatile storage indicating that the access request is from the first customer directed to the first non-volatile storage;

checking whether the data stream contains a malicious pattern of the plurality of malicious patterns by examining whether the set of malicious patterns indicates that access of the first non-volatile storage by the first customer is a malicious attack, wherein the access request is deemed to contain the malicious pattern when the combination of the customer identifier and the storage identifier is contained in a first malicious pattern of the set of malicious patterns, if the data stream does not contain the malicious pattern, forwarding the access request to the first non-volatile storage; and if the data stream does contain the malicious pattern, concluding that the access request is a malicious attack corresponding to the malicious pattern, and blocking the access request to the first non-volatile storage.

* * * * *

UNITED STATES PATENT AND TRADEMARK OFFICE
CERTIFICATE OF CORRECTION

PATENT NO. : 11,677,778 B2
APPLICATION NO. : 16/949175
DATED : June 13, 2023
INVENTOR(S) : Bilugu et al.

Page 1 of 1

It is certified that error appears in the above-identified patent and that said Letters Patent is hereby corrected as shown below:

In the Specification

In Column 11, Line 64, Delete "container 1" and insert -- container1 --.

In Column 17-18, Line 18 (Approx.) (Appendix), Delete "container 1" and insert -- container1 --.

Signed and Sealed this
Ninth Day of April, 2024

Katherine Kelly Vidal
*Director of the United States Patent and Trademark Office*